United States Patent [19]

Margen

[11] 4,140,584
[45] Feb. 20, 1979

[54] DISTILLATION PLANT

[75] Inventor: Peter H. E. Margen, Nyköping, Sweden

[73] Assignee: Aktiebolaget Atomenergi, Stockholm, Sweden

[21] Appl. No.: 738,286

[22] Filed: Nov. 3, 1976

Related U.S. Application Data

[63] Continuation-in-part of Ser. No. 548,098, Feb. 7, 1975, Pat. No. 4,004,984.

[51] Int. Cl.² ............................................. B01D 3/10
[52] U.S. Cl. ........................... 202/173; 159/DIG. 42; 159/DIG. 15; 203/86
[58] Field of Search ............ 202/173, 174; 159/2 MS, 159/DIG. 42, DIG. 15; 203/86

[56] References Cited

U.S. PATENT DOCUMENTS

| | | | |
|---|---|---|---|
| 3,050,786 | 8/1962 | John et al. | 159/28 R |
| 3,180,805 | 4/1965 | Chirico | 202/173 |
| 3,372,096 | 3/1968 | Tidball | 159/2 MS |
| 3,438,432 | 4/1969 | Wetch et al. | 203/86 |
| 3,515,645 | 6/1970 | Wetch | 203/11 |
| 3,713,989 | 1/1973 | Bom | 159/2 MS |
| 3,763,014 | 10/1973 | Barba et al. | 159/2 MS |
| 3,801,471 | 4/1974 | Sato et al. | 159/2 MS |
| 4,004,984 | 1/1977 | Margen | 202/173 |

OTHER PUBLICATIONS

Figure 2:
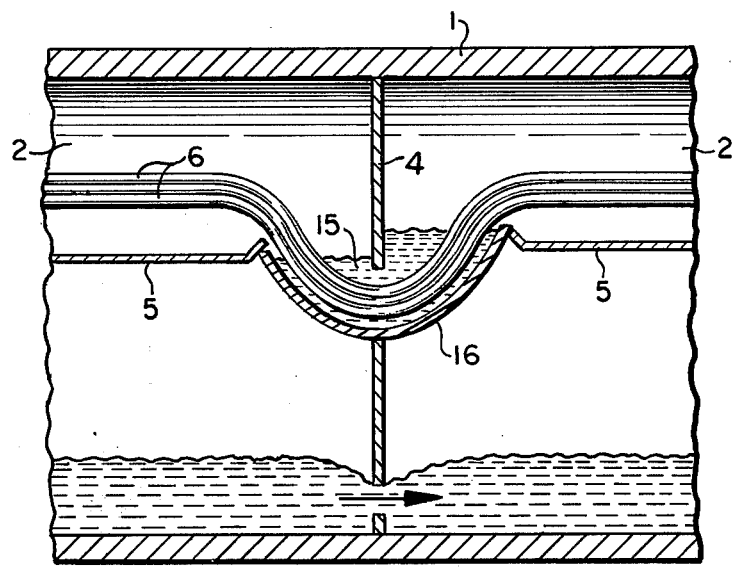

Study of 150 MGD Desalted Water–Galstarn et al., Oct. 1965, p. 1, FIG. 2.

Primary Examiner—Hiram H. Bernstein
Attorney, Agent, or Firm—Toren, McGeady and Stanger

[57] ABSTRACT

There is provided a distillation plant of the multiple stage flash distillation type. The plant comprises a reinforced concrete shell which is divided into a large number of flash chambers and a heat supply chamber by means of partitions. A bundle of condensation tubes, preferably of plastic, extend throughout all of the chambers. The inlet and outlet manifolds for the tube bundle are defined by an end of the shell and an adjacent partition. The shell has preferably a plastic coating or consists of a polymer concrete. Preferably, the partitions consist of or comprise plastic so that a bundle of plastic tubes may be sealed to openings in the partitions by gluing or welding.

5 Claims, 3 Drawing Figures

U.S. Patent  Feb. 20, 1979  4,140,584

DISTILLATION PLANT

This is a continuation-in-part to U.S. Ser. No. 548,098 filed on Feb. 7, 1975 now U.S. Pat. No. 4,004,984 issued Jan. 25, 1977.

The present invention refers to a distillation plant comprising a heat supply chamber, several serially arranged vaporizing chambers of sub-pressure type, said vaporizing chambers being arranged in a common shell, and being defined by said shell and partitions, a bundle of condensation tubes extending through all the vaporizing chambers, distilland flowing through said tubes, a basin in each vaporizing chamber, through which basins heated distilland flows, and a condensate trough in each vaporizing chamber, said trough being positioned under the tubes, for gathering of the distillate.

In desalination plants of the MSF-type (Multiple Stage Flash) large amounts of tubes of a metal, which is corrosion resistant, are required. Metals which can stand the actual water contaminants and corrosion attacks are under development, but hitherto it has not been possible to find suitable materials of reasonable costs. In known plants of the indicated type, there are also difficulties concerning the sealing between the tubes and the manifolds for the vaporizing chambers, and further to this, the manufacturing costs for these manifolds are high. Suitable metals for the tubes have such dilatation properties that the tubes must be fitted with a sliding seal or be designed as slings in each vaporizing chamber, in order to avoid excessive stresses and the risk for leakage due to failure in the tubes and the seals.

The present invention offers a solution to said disadvantages and will also provide solutions to other problems occurring in known plants of the indicated type.

The characterizing features of the invention are that the condensation tubes extend also through the heat supply chamber and may consist of plastic, and that the heat supply chamber is positioned within the shell and is defined by the shell and at least one partition. The tubes extend through an opening in each partition. Said partitions may consist of plastic and the tubes may be sealed to the partitions by means of for example gluing or welding. The open spaces between the separate tubes of the tube bundle are eliminated at the positions which are intended to lie at the separation walls and the outer parts of the bundle are sealed to the walls by means of gluing or welding. The spaces between the tubes of the bundle may be eliminated by pressing together the bundle of tubes while locally heating the bundle in the pressing area, so that the outer surfaces of the tubes are welded to each other. Alternatively the spaces between the tubes of the bundle may be eliminated by applying a sealing agent between the tubes. In one embodiment, the openings for the tube bundle in the partitions are provided with bowls, which together with that part of the wall, that is positioned above the aperture, constitute water locks, which are filled with distillate, so that said water locks seal the chambers from each other. Said bowl may be filled with distillate from a condensate trough. The bowl may be arranged to permit an overflow of distillate from a chamber of high pressure to the condensate trough in the adjacent chamber of lower pressure.

Very low volumetric costs for thin wall tubes of plastic, for example polyvinylchloride, PVC or polyethylene PE (said costs being only a few percent of those for metal tubes) makes it possible to economically utilize plastic tubes in desalination plants, especially of the MSF-type, which require large tube areas, if the operation temperatures are limited to those, which cheap polymers can stand. If the plant is operated at a temperature in the range of 50°–25° C., it is possible to utilize tubes of of PVC, which have a high coefficient of thermal conductivity, or HDPE, the advantage with PVC being that it has a better strength and may be glued. At higher temperatures, 90°–50° C., post chlorinated PVC or cross linked polyethylene can be utilized, and this leads only to a moderate rise in material costs. For plants with a temperature range of 90°–25° C., said types of materials may be used in separate parts of the plant. Similarly metal tubes may also be utilized in the heating chamber, for example. The drawback with the low thermal conductivity of the plastic in comparison with that of metal can easily be reduced by increasing the number of plastic tubes, while the tubes are made with a smaller diameter than is usual for tubes in plants using metal tubes, and due to the low costs for the plastic material, it is possible to increase the total tube surface in each chamber by increasing the number of tubes therein without substantially raising the costs.

The vaporizing chambers may according to the invention be defined by means of a shell, which is common for the chambers and which may consist of plastic coated concrete or polymer concrete, for example, said shell being divided into chambers by means of partitions, which advantageously may be made of plastic concrete or plastic coated concrete or only of a relatively thin plastic board, preferably of the same type of material as that of the tubes, as the separation walls only have to take up those loads, which refer to the pressure differential between adjacent chambers.

The plant according to the invention has further the advantage that the plastic tubes readily may be moved through and sealed to the separation walls. Alternatively, a water lock can be provided in the separation wall with the plastic tubes passing through the water lock so that a seal is provided between adjacent chambers. Further to this the tubes may readily be made in situ and directly after extrusion be moved in through the chambers, whereafter the tubes are sealed to the separation walls or their coatings.

According to the invention the seal between the chambers may be obtained by arranging separate apertures in the partition for every single tube, and by gluing or welding or moulding each tube at the opening. Another way of arranging the seal is to pull the bundle of tubes through a single aperture in the partition and to seal the spaces between the tubes of the bundle by locally compressing the bundle by heating the bundle in that area, so that the tubes are welded together, or by locally applying a sealing composition between the separate tubes of the bundle, whereafter the sealed tube bundle is sealed to the opening in the separation wall, as described above.

Figure 1:
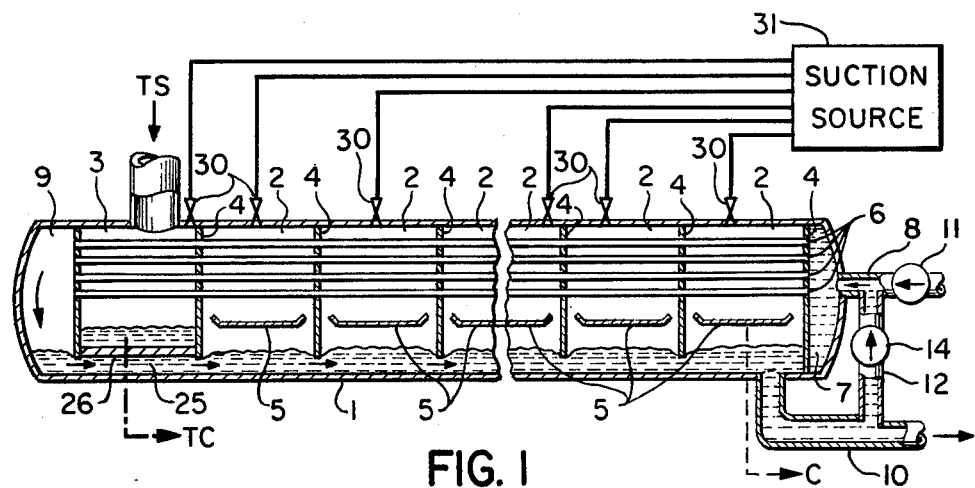
Figure 3:
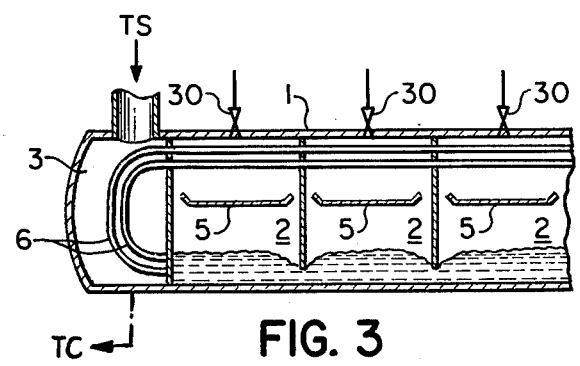

In the following the invention will be more closely described with reference to the enclosed drawings, in which FIG. 1 shows a longitudinal section through a plant according to the invention, FIG. 2 shows a sealing arrangement at a partition between the vaporizing chambers of the plant and a tube bundle, and FIG. 3 shows a longitudinal section through part of another embodiment of the plant according to the invention.

FIG. 1 shows schematically a longitudinal section through a desalination plant comprising a concrete shell 1, which surrounds several flash chambers 2 and a heat supply chamber 3, which for example may be fed by steam TS from a turbine (not shown). The chambers 2 and 3 are separated from each other by means of partitions 4, which have apertures for a bundle of straight plastic tubes 6. In each chamber 2, 3 a condensate trough 5 is positioned under the tube bundle 6 for gathering of the condensate. The condensate troughs are emptied via conduits such as the outlet C shown from the chamber 2 at the right-hand end of the shell 1. An inlet manifold 7 is defined by the inlet end of the shell 1 and the adjacent partition 4 and is provided with an inlet conduit 8 for brine. A second water manifold 9 is defined by the other end of the shell 1 and an adjacent partition 4.

Salt water is fed into the plant via the inlet conduit 8 to the manifold 7, from where it flows through the plastic tubes 6 to the manifold 9. From the manifold 9 the salt water flows through conduit 25 defined by the bottom of the shell 1 and a wall 26, into the vaporizing chamber 2, that is situated at the left end of FIG. 1, and from there along the bottom of the shell through the bottom part of the partitions out to the outlet conduit 10.

The inlet conduit 8, which comprises a feeding pump 11, and the outlet conduit 10 are connected to a shunt conduit 12, which is provided with a recirculation pump 14.

The cold salt water leaving the manifold 7 is preheated as it flows through the plastic tubes 6 from the right hand end of FIG. 1 towards the left end of the tubes 6, as shown in FIG. 1. The preheating occurs due to the fact that relatively warm steam condenses on the tubes 6, and the successive preheating is due to the fact that the steam temperature is higher in the vaporizing chambers closest to the heat supply chamber 3. The salt water, thus preheated in the chambers 2 and heated in the heat supply chamber 3, flows into the manifold 9 and flows from there along the bottom of the shell from left to right as shown in FIG. 1. Due to the decreasing pressure in the chambers 2 from left to right, as shown in FIG. 1, the steam temperature in the chambers will decrease from left to right in FIG. 1 and therefore the temperature differential between the condensation tubes and the steam will be substantially constant in each chamber.

The heat supply chamber 3 is fed with turbine steam TS, and the turbine steam S will condense on the tubes 6 in the chamber 3 and the resulting turbine condensate TC may be recirculated to the turbine.

As an example, with reference to FIG. 1, the cold brine entering the inlet manifold 7 can have a temperature of 23° C., and is preheated 2° C. in each chamber 2, so as to have a temperature of around 50° C. when entering the heat supply chamber 3. The turbine steam TS entering the chamber 3 can have a temperature of 56° C.

The shell 1 may consist of reinforced concrete and may internally be covered with a plastic for the sake of tightness.

FIG. 2 shows a partition or separation wall 4 between two chambers 2, which are surrounded by the shell 1. The condensate trough 5 is arranged under the tube bundle 6 in each chamber 2. An aperture 15 for the tube bundle 6 in the separation wall 4 is provided with a bowl 16, which is filled with a condensate and which together with the separation wall constitutes a water lock, through which the tube bundle 6 extends. The water lock seals the chambers from each other. The bowl 16 is filled with condensate water from the trough 5 or the tube bundle 6 in the adjacent chamber of higher pressure. The water surface of the water lock will be positioned on different heights on opposite sides of the wall 5, due to the pressure differential between the flash chambers or vaporizing chambers 2. The position of the edge of bowl 16 in the chamber of lower pressure should preferably be adapted so that the condensate flows over the edge of the bowl and down into the trough 5, so that the water of the water lock is changed continuously.

It should be appreciated that the plant according to the invention may well be utilized for distillation of any liquid, and that the specific reference to salt water distillation is made for description purposes only.

The plant illustrated in FIG. 1 may comprise a large number of vaporizing chambers (more than 10). The sub-pressure in the vaporizing chambers may be obtained by throttling the brine flow between adjacent chambers, and/or by a vacuum pump 31, which is connected to ejectors 30, (FIG. 1) adapted also to remove incondensible gases from the chambers.

At least part of the sub-pressure may be achieved by arranging the outlet and inlet for salt water at different levels, so as to obtain a siphon effect.

The condensate troughs 5 may be connected to each other (via the bowls 16, for example, c.f. FIG. 2) so that condensate C has to be collected from the (in FIG. 1) rightmost chamber 2 only.

FIG. 3 illustrates a plant, in which only shell end portion including the heat supply chamber, and the tube run differ from those of the plant according to FIG. 1.

In FIGS. 1 and 3, equal reference numerals denote corresponding parts.

In the plant according to FIG. 3 the heating chamber 3 is defined by the end portion of the shell and a partition 4. In chamber 3 the tubes are bent back and arranged to discharge into the chamber 2 adjacent heating chamber 3. In contrast to FIG. 1 the FIG. 3 embodiment has neither a plenum chamber 9 nor a conduit 25.

Ejectors for removal of incondensible gases and equipment for providing various sub-pressures in the chambers (generally indicated by 30) have merely been sketched in the drawings, since they are conventional elements, the use of which is obvious to those skilled in the art.

What is claimed is:

1. Distillation plant comprising an axially elongated horizontally extending tubular shaped shell having a first end and a second end, a plurality of generally vertically positioned horizontally spaced partitions extending transversely of the axis of said shell and dividing the interior of said shell between the first and second ends into a plurality of serially arranged vaporizing chambers, each said vaporizing chamber consisting of the entire space extending between a pair of said partitions and bounded by the full lateral extent of said shell between the pair of said partitions, a bundle of flexible heat resistant plastic condensation tubes extending continuously through all of said vaporizing chambers from adjacent the first end of said shell to adjacent to second end thereof and passing through said partitions between adjacent vaporizing chambers, means located adjacent the first end of said shell for introducing distilland into the ends of said tubes located for flow through said tubes in the direction from the first end toward the second end of said shell, a basin for distilland in each vaporizing chamber below the tubes passing therethrough, heated distilland flowing through said basins, a condensate trough in each vaporizing chamber located below the tubes passing therethrough and above the basin therein for gathering of distillate dripping down from the condensation tubes, means for removing distillate from said troughs, said condensation tubes extending also through a heating chamber, said heating chamber being contained within the shell and sealed from the distilland flowing therethrough, said heating chamber being located after the last vaporizing chamber adjacent the second end of said shell, means for feeding exhaust vapor from a vapor turbine into said heating chamber for heating the distilland by indirect heat transfer, whereby the turbine vapor condenses on the condensation tubes extending through said heating chamber such that the distilland passing through said tubes is heated before transfer to said basins, and means for removal of turbine vapor condensate from said heating chamber wherein said heating changer is defined by said shell and two adjacent partitions, said second end of said shell and the adjacent partition forming a plenum chamber into which the tubes discharge after sealed passage through said heating chamber, a conduit extending through said heating chamber and communicating said plenum chamber with said basin in the vaporizing chamber next adjacent to said heating chamber.

2. Distillation plant as set forth in claim 1 wherein at least one of the partitions has an opening therethrough with said tube bundle passing through said opening, a bowl positioned in the opening in said partition and extending outwardly therefrom into each of the adjacent said vaporizing chambers with the upper edge of said bowl located at least above the uppermost point of the opening through said partition, said tube bundle extending through said bowl on both sides of said partitions, and said bowl arranged to receive distillate to a level above the uppermost point of the opening in said partition so that a water lock is formed within said bowl for sealing adjacent said vaporizing chambers from one another.

3. Distillation plant, as set forth in claim 2 wherein said vaporizing chamber on one side of the opening through said partition is arranged to operate at a higher pressure than said vaporizing chamber on the other side of the opening through said partition, a trough in said vaporizing chamber operating at the lower pressure with said trough arranged to receive water flowing from said vaporizing chamber operating at the higher pressure over the upper edge of said bowl under the action of the differential pressure between the two adjacent said chambers.

4. Distillation plant, as set forth in claim 2, wherein the tubes of said bundle passing through said bowl are disposed in spaced relation to the edge of the opening through said partition.

5. Distillation plant, as set forth in claim 2, wherein said partitions are formed of a plastic material of the same type as said plastic tubes.

* * * * *